US008588354B2

(12) United States Patent
Carson

(10) Patent No.: US 8,588,354 B2
(45) Date of Patent: Nov. 19, 2013

(54) EGRESS POINTER SMOOTHER

(75) Inventor: Mark Brian Carson, Belfast (GB)

(73) Assignee: Flextronics AP, LLC, San Jose, CA (US)

(*) Notice: Subject to any disclaimer, the term of this patent is extended or adjusted under 35 U.S.C. 154(b) by 903 days.

(21) Appl. No.: 11/704,732

(22) Filed: Feb. 9, 2007

(65) Prior Publication Data

US 2007/0201593 A1  Aug. 30, 2007

Related U.S. Application Data

(60) Provisional application No. 60/772,145, filed on Feb. 9, 2006.

(51) Int. Cl.
*H04L 7/00* (2006.01)

(52) U.S. Cl.
USPC .......................................... 375/354; 375/355

(58) Field of Classification Search
USPC .......... 375/372, 371, 118, 354, 373; 370/506, 370/516; 711/154
See application file for complete search history.

(56) References Cited

U.S. PATENT DOCUMENTS

| | | | | |
|---|---|---|---|---|
| 4,866,704 A | * | 9/1989 | Bergman | 370/452 |
| 4,928,275 A | * | 5/1990 | Moore et al. | 370/506 |
| 4,937,820 A | | 6/1990 | Kawula | |
| 4,996,698 A | | 2/1991 | Nelson | |
| 5,268,936 A | * | 12/1993 | Bernardy | 375/372 |
| 5,497,405 A | | 3/1996 | Elliott et al. | |
| 5,548,534 A | * | 8/1996 | Upp | 370/504 |
| 5,796,796 A | * | 8/1998 | Wang | 375/372 |
| 5,852,630 A | * | 12/1998 | Langberg et al. | 375/219 |
| 6,052,385 A | * | 4/2000 | Kanerva et al. | 370/468 |
| 6,064,706 A | | 5/2000 | Driskill et al. | |
| 6,304,936 B1 | | 10/2001 | Sherlock | |
| 6,622,205 B1 | | 9/2003 | Weiss | |
| 6,744,787 B1 | * | 6/2004 | Schatz et al. | 370/506 |
| 6,765,928 B1 | | 7/2004 | Sethuram et al. | |
| 6,882,662 B2 | * | 4/2005 | Subrahmanyan et al. | 370/506 |
| 6,925,506 B1 | | 8/2005 | Raza et al. | |
| 6,959,015 B1 | * | 10/2005 | Hwang et al. | 370/516 |
| 6,982,993 B1 | * | 1/2006 | Claveloux et al. | 370/503 |
| 7,227,876 B1 | * | 6/2007 | Cochran et al. | 370/509 |
| 7,369,496 B1 | * | 5/2008 | Wiggins et al. | 370/235 |
| 7,519,788 B2 | | 4/2009 | LaBerge | |
| 7,646,836 B1 | * | 1/2010 | Mays | 375/354 |
| 7,876,760 B2 | | 1/2011 | Carson | |

(Continued)

OTHER PUBLICATIONS

International Search Report, PCT/US2007/03616, dated Dec. 5, 2007.

(Continued)

*Primary Examiner* — Shuwang Liu
*Assistant Examiner* — Helene Tayong
(74) *Attorney, Agent, or Firm* — Sheridan Ross P.C.

(57) ABSTRACT

A method and apparatus that allows egress pointer smoothing data by evaluating the average fill of an elastic store. For one embodiment of the invention, by measuring the average fill, the 3 bytes of SOH and 87 bytes of data are taken together in each sample, and the relative phase of ingress and egress frames does not impact the fill depth calculation. For one such embodiment, the calculation is performed by summing the elastic store fill over a full row and increment/decrement decisions based on that average figure provide smooth rate of pointers coming out even as a section overhead moves through the frame.

18 Claims, 4 Drawing Sheets

(56) References Cited

U.S. PATENT DOCUMENTS

| | | |
|---|---|---|
| 8,059,642 B2 | 11/2011 | Carson |
| 8,300,748 B2 | 10/2012 | Carson |
| 2001/0012288 A1 | 8/2001 | Yu |
| 2001/0043603 A1* | 11/2001 | Yu .................................. 370/393 |
| 2002/0144169 A1* | 10/2002 | Ranganath et al. ........... 713/400 |
| 2003/0061362 A1* | 3/2003 | Qiu et al. ...................... 709/229 |
| 2003/0112685 A1 | 6/2003 | Duh et al. |
| 2003/0120799 A1 | 6/2003 | Lahav et al. |
| 2004/0042462 A1* | 3/2004 | O'Neill et al. .............. 370/395.5 |
| 2005/0041450 A1* | 2/2005 | Duh et al. .......................... 365/1 |
| 2005/0198361 A1 | 9/2005 | Chandra et al. |
| 2005/0213603 A1 | 9/2005 | Karighattam et al. |
| 2005/0220240 A1 | 10/2005 | Lesso |
| 2006/0002405 A1 | 1/2006 | Le Sauze et al. |
| 2006/0190641 A1 | 8/2006 | Routliffe et al. |
| 2007/0121499 A1* | 5/2007 | Pal et al. ....................... 370/230 |
| 2008/0165888 A1* | 7/2008 | Wiggins et al. ............... 375/295 |
| 2008/0235504 A1 | 9/2008 | Brown et al. |

OTHER PUBLICATIONS

Office Action in U.S. Appl. No. 11/704,731, mailed Sep. 15, 2009.
Office Action in U.S. Appl. No. 11/704,731, mailed May 19, 2010.
Office Action in U.S. Appl. No. 11/901,743, mailed Oct. 26, 2009.
Office Action in U.S. Appl. No. 11/901,743, mailed Jun. 30, 2010.
Office Action in U.S. Appl. No. 11/901,743, mailed Aug. 31, 2010.
Office Action in U.S. Appl. No. 11/899,726, mailed Jun. 22, 2010.
Notice of Allowance in U.S. Appl. No. 11/901,743, mailed Nov. 4, 2010.
Office Action in U.S. Appl. No. 11/704,731, mailed Oct. 13, 2010.
Office Action in U.S. Appl. No. 11/899,726, mailed Nov. 29, 2010.
Notice of Allowance in U.S. Appl. No. 11/901,743, mailed Dec. 10, 2010.
Office Action in U.S. Appl. No. 11/899,726, mailed Apr. 1, 2011.
Notice of Allowance in U.S. Appl. No. 11/704,731, mailed May 26, 2011.
Notice of Allowance in U.S. Appl. No. 11/704,731, mailed Jul. 7, 2011.
Office Action in U.S. Appl. No. 11/899,726, mailed Oct. 14, 2011.
Official Action for Taiwan Patent Application No. 96104865, mailed Oct. 16, 2012, 5 pages (English translation).
Notice of Allowance for U.S. Appl. No. 11/901,743, mailed Nov. 4, 2010, 4 pages.
Notice of Allowance for U.S. Appl. No. 11/899,726, mailed Jun. 27, 2012, 14 pages.

* cited by examiner

EGRESS POINTER SMOOTHER

CLAIM OF PRIORITY

This application is a non-provisional application claiming priority to provisional application Ser. No. 60/772,145, filed on Feb. 9, 2006, entitled "METHODS AND APPARATUS FOR CONDUCTING SINGLE STATE POINTER PROCESSING, RATE ADAPTATION BY DELETION OF UNUSED OVERHEAD BYTES, TECHNIQUE FOR MARKING J1/V5 POSITIONS IN AN ELASTIC STORE, EGRESS POINTER SMOOTHING, CENTRALIZED OVERHEAD AND POINTER PROCESSING," which is herein incorporated by reference in its entirety.

FIELD

Embodiments of the invention relate generally to the field of data communication and more specifically methods and apparatuses for providing efficient network data communications.

BACKGROUND

Conventional system architecture for a Sonet/SDH system has a number of disadvantages including excessive number of logic devices, redundant processing operations, and inefficient use of memory. FIG. 1 illustrates a system architecture for a Sonet/SDH system in accordance with the prior art.

Egress Pointer Movements

An inefficient aspect of the system architecture shown in FIG. 1 is the conventional egress pointer smoothing scheme employed. When performing high order pointer processing of a SDH/Sonet frame, the presence of 3 bytes of section overhead at the start of each row of 87 payload bytes, can result in uneven pointer adjustments as the phase of line and local frame change. At the output of the elastic store there is circuitry which is generating a solid SDH frame structure which is aligned to the system clock, which has spaces in it for customer data which haven't been used as yet. Every time one of those spaces comes up the elastic store reads a byte of customer data which has been written into it by the labeler and passes it on to the point of generation block and out of the system. So if everything in the network is synchronized what will happen is the labeler will be writing one byte in at the same rate the high order pointer, or the elastic store, is writing one byte out to the rest of the network. However, due to frequency differences this is not always the case. The pointer generator checks each of the FIFOs of the elastic store, in turn, to determine if that FIFO is at or near a full threshold or an empty threshold. If either condition exists, the pointer generator will perform a pointer increment or decrement, respectively, which adds a byte into the payload or deletes a byte from the payload.

The determination is made at a precise spot within the frame, however the section overhead could be rolling past this sampling point. The sampling point is a fixed position in the outgoing frame, but the incoming frame can be moving relative to that. So as the section overhead goes past nothing is written in, but data is still being read out. The elastic store appears to empty quite quickly and pointers will be written erratically (either a burst of pointers or none) during this time. This erratic behavior may appear to change the frequency at which the customer data is arriving over a very short period or may cause bit errors.

This behavior is undesirable, and various techniques have been adopted to smooth the egress pointer adjustments.

Marking Synchronization Positions in the Elastic Store

Conventional methods of signaling the position of the synchronization bytes in the elastic store either use memory inefficiently or unduly increase system complexity. A high or low order elastic store in a SDH/Sonet system requires one byte in each frame of data to be marked for synchronization purposes. Conventionally this is the J1 byte for High Order traffic, and the V5 byte for low order traffic. This is normally achieved by adding one bit to the byte in the elastic store, and setting this bit high only when the associated byte contains the appropriate byte. This increases the width of the required memory by 1 bit. Good design practice also requires that a 1 bit parity signal is calculated for each traffic byte, and passed through the system for error checking. These two requirements mean that a conventional elastic store memory would need to be 10 bits wide (8 data bits, 1 parity bit, one flag bit). Typical memories in FPGAs are 9 or 18 bits wide. Thus a 10 bit word will need an 18 bit memory, and will use twice the memory resource that would be needed if it could be implemented using a 9 bit memory.

This disadvantage has been addressed in various ways in the prior art. When implementing ASIC designs, the designer can typically generate memories of any word width, so the need for 10 bit memories is not restrictive. In FPGA designs, the designer has the option of terminating parity on the input of the Elastic Store, and regeneration in on the output. This means that parity protection is not complete within the device, which is undesirable.

Another technique known to be used is to deliberately introduce a parity error on the byte to be labeled. Since these occur on a regular basis, and circuit on the output of the elastic store can verify that these occur when expected, and reset the deliberate changes back to their true state. Implementing this function adds significant design complexity. 10 bit RAMs are inefficient in FPGA implementations. Inverting the parity bit adds significant complexity, and can result in false diagnostic error reports within the device.

Overhead and Pointer Processing

A further disadvantage of the conventional system architecture is overhead and pointer processing. The overhead and pointer processing blocks of a SDH/Sonet system are conventionally directly coupled to the traffic path. In order to achieve high traffic throughput, a typical ASIC or FPGA will implement several traffic paths (or lanes) in parallel. Each lane will carry a portion of the overall traffic. Each lane in a high bandwidth device will contain all the logic associated with processing pointers and overhead associated with that lane. This occupies a large number of gates, but is used for only a small fraction of the payload. That is, the actual gates within the design dedicated to a particular lane are only being used 3-5% of the time, and when those gates aren't being used, identical gates in other lanes are being used.

SUMMARY

An embodiment of the invention provides an apparatus including an elastic store, an integrator to determining an average fill value of the elastic store, and a pointer generator to perform a pointer increment/decrement operations based upon the average fill value.

Other features and advantages of embodiments of the present invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
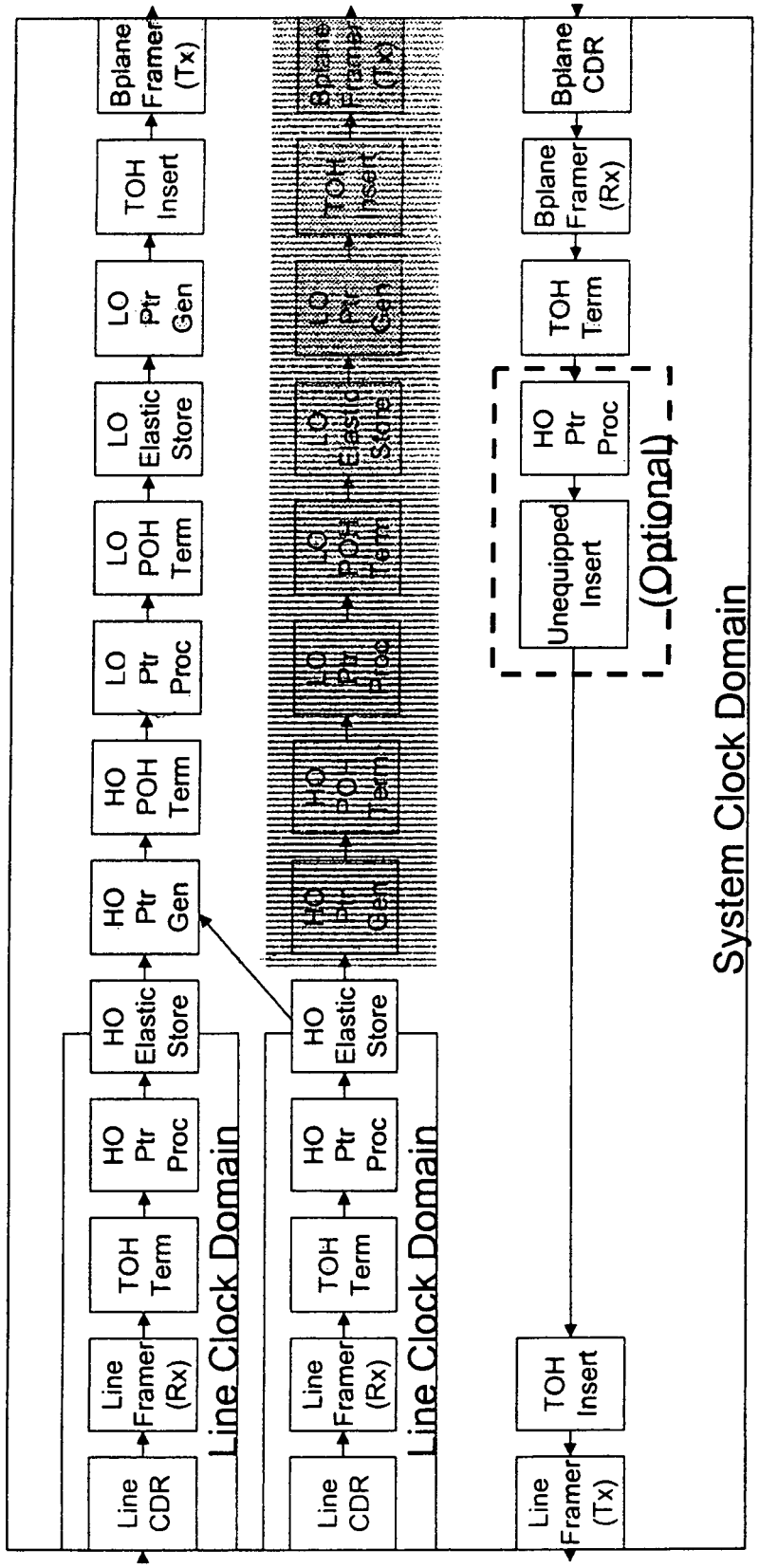
FIG. 1 illustrates a system architecture for a Sonet/SDH system in accordance with the prior art.

A method and apparatus that allows egress pointer smoothing data by evaluating the average fill of an elastic store. For one embodiment of the invention, by measuring the average fill, the 3 bytes of SOH and 87 bytes of data are taken together in each sample, and the relative phase of ingress and egress frames does not impact the fill depth calculation. For one such embodiment, the calculation is performed by summing the elastic store fill over a full row. The result is 87 times the average fill level. The average can be calculated by dividing the result by 87. In an alternative embodiment, the thresholds (which are constant) are multiplied by 87. This multiplication is performed during synthesis. This allows non-integer thresholds to be used, so for example the lower threshold may be set at 3.3 rather than just 3 or 4, as in prior art schemes. For one embodiment of the invention, the size of the comparator logic is reduced by selecting thresholds that have a number of the least significant bits set to '0' (binary), so that they may be ignored in the comparison.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Embodiments of the invention are applicable to wide range of systems in which data is communicated.

Egress Pointer Smoothing

For one embodiment of the invention, egress pointer smoothing by evaluating the average fill of an elastic store over a full payload row. For alternative embodiments the evaluation could be performed over several rows or a full frame with added logic complexity.

For one embodiment of the invention, the information related to the amount of fill in the elastic store is averaged across the length of the complete row. Therefore, as the section overhead from an incoming channel moves through the outgoing section, the average fill of the elastic store is being measured including the information of where the section overhead sits within the row. Increment/decrement decisions based on that average figure provide a smooth rate of pointers coming out even as a section overhead moves through the frame.

For one embodiment of the invention, the average value is compared to a fixed upper and lower bound and if the average exceeds an upper bound this results in an increment decision, and if the average value is less than a lower bound this results in a decrement decision.

For one embodiment, to avoid the complexity of division to obtain an average value, the upper and lower bounds, which are themselves constants, are multiplied by the number of samples the sum is compared. The number of samples depends on the type of data traffic and may be, for example, 87 for an STS-1 or 3 for a VT1.5.

Figure 2:
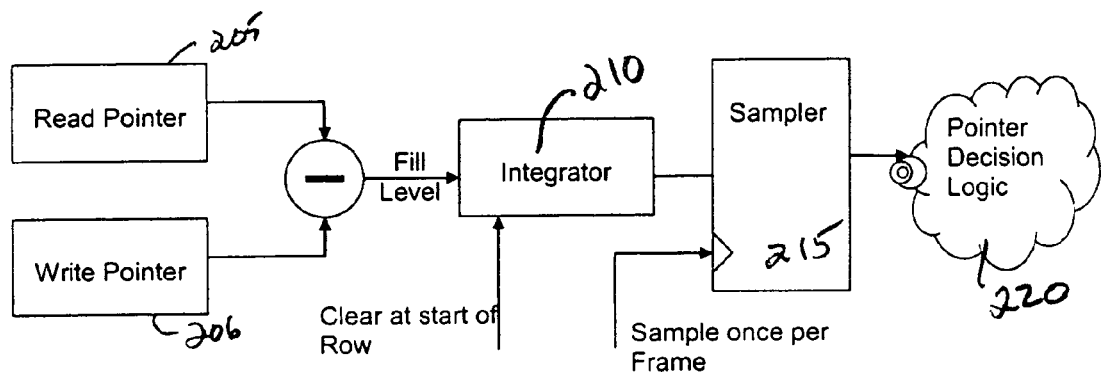
FIG. 2 illustrates a device for effecting egress pointer smoothing in accordance with one embodiment of the invention.

FIG. 2 illustrates a device for effecting egress pointer smoothing in accordance with one embodiment of the invention. As shown in FIG. 2, the read pointer 205 and write pointer 206 are accumulating the fill level of the elastic store. An integrator 210 is included which will be used to store the elastic store depth values. At the beginning of each one of specified periods of time, which for one embodiment could be the beginning of each row, the counter is reset to zero. Then for each successive byte across the row the instantaneous value of the elastic store depth is determined and added to the integrator 210.

At a specified point, the elastic store depth is sampled by sampler 215 and the elastic store depth value is forwarded to pointer decision logic 220. Pointer decision logic 220 compares the value to a defined threshold and makes a decrement/increment decision based on that comparison. If the sum of the information in the integrator is either greater than the upper bound, an increment is performed, if the sum is between the upper bound and the lower bound, no action is taken, and if the sum is less than the lower bound a decrement is performed.

The smoothness obtained depends on the number of bytes accumulated and presents a tradeoff between smoothness and the logic required to effect it.

Marking Synchronization Positions in the Elastic Store

Embodiments of the invention, provide a signaling mechanism for marking particular bytes in the payload stream (e.g., elastic store synchronization bytes) by using a write pointer function as opposed to prior art schemes that require a flag bit in the elastic store. Embodiments of the invention allow for an elastic store that need only be 9 bits wide. The number of bits in the write pointer register or memory is doubled, plus an extra flag bit, but since this memory is typically 16 or 32 times smaller than the elastic store, the overall memory utilization is less. The extra bit indicates if a flagged byte has been written to the elastic store recently, in which case, the additional bits are used to pass the write pointer value at which the flagged byte was written, from the write to the read controller of the elastic store.

A further advantage is that the signaling mechanism can be used to signal other conditions and pass fault indication flags from the ingress port to the egress port of the elastic store.

Figure 3:
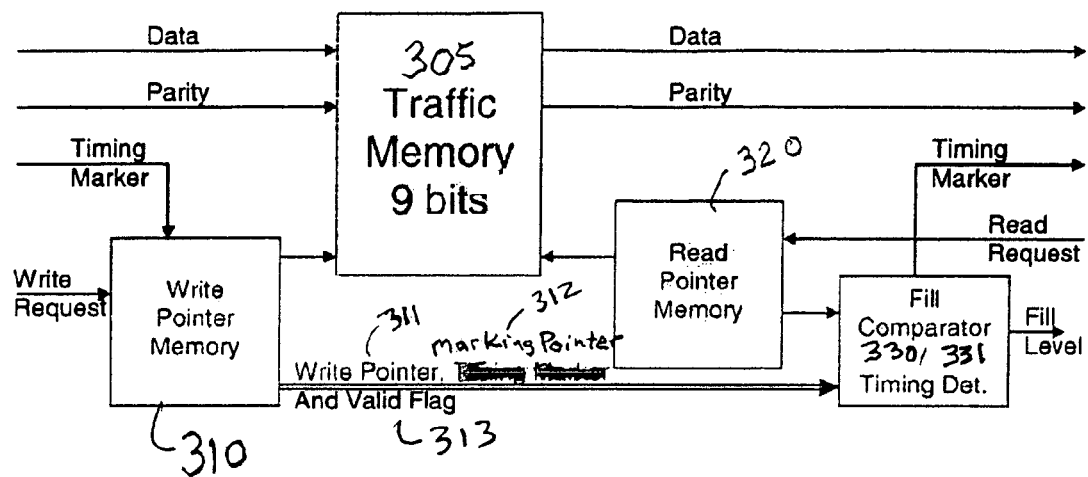
FIG. 3 illustrates an elastic store design in accordance with one embodiment of the invention.

FIG. 3 illustrates an elastic store design in accordance with one embodiment of the invention. As shown in FIG. 3, an embodiment of the invention provides an alternative method of signaling the position of the J1 through the elastic store.

The traffic memory 305 is made up of lots of separate FIFOs, with each independent FIFO having its own write pointer and read pointer. The write pointer memory in the prior art consists of one pointer (a write pointer field) which goes from, for example, zero up to 15 back to zero and keeps on repeating that. An embodiment of the invention implements a second field (a marking pointer field) in the write pointer memory 310, which, for one embodiment, is the same width as that original counter space (e.g., four bits wide), and a third field (an additional bit) for a valid flag. When an in-coming bit (e.g., a J1 bit) is to be written to a particular location inside the traffic memory 305, one of these values from zero to 15, the write pointer 311 instructs the traffic memory 305 to write that information into the particular location for that channel. The information is copied into the additional field and that indicates, for example, that there is now a J1 byte at that position in the traffic memory. The valid flag bit is set to indicate that the value at the location is currently valid. This signaling method requires that only nine bits of data be put into the traffic memory 305. The read pointer memory 320 functions as in the prior art scheme. The fill comparator 330 not only compares the read pointer and the write pointer to calculate the FIFO depth, as in the prior art scheme, but also compares the read pointer to the marking pointer 312. When the fill comparator 330 detects that the read pointer has reached the particular location and that the valid flag 313 is true, this indicates that what is being read out of the traffic memory 305 is the in-coming byte that is to be marked.

Therefore, the marker bit was not placed in traffic memory 305, but is stored in the write pointer memory 310 at a location that is made visible to the fill comparator 330, which can now assert a signal indicating that the byte which has just been read by the read pointer memory 320 from the traffic memory 305 is the marked byte.

Typically, a marking event occurs approximately every 760 bytes. So since the actual traffic memory for every channel has only 16 bytes, the write pointer clears the valid flag the next time it comes around to the particular location, because it is about to overwrite the location that the marked byte had been in the last time. The read pointer then clears the valid flag. It doesn't actually have to do anything with the marking pointer as the value at that location will be changed to some new value and the valid flag will be reset.

Although the example discussed above was in reference to a single channel and particular byte of that channel, in a typical system there are hundreds of channels going on at the same time. The write pointer memory, therefore could have hundreds of marking pointers stored for individual channels. There is only one write pointer and marking pointer for each channel but there could be hundreds of them stored in the write pointer memory. The correct one, represented by the double arrow of FIG. 3 from the write pointer memory 310 to the fill comparator 330, represents the piece of information related to the channel that the read logic is currently processing.

As noted above, embodiments of the invention allow signaling additional information from the input to the output of the elastic store by using the marking pointer bytes. For example, if the valid flag 313 is zero then the timing detector block 331 ignores the marking pointer value and the read pointer does not perform a comparison. That is, there is no interpretation given to the marking pointer value. Therefore, interpretations can be assigned to its value to signal additional information. So, for example, with the valid flag of zero and with no J1 bytes in the elastic store at the minute, a marking pointer value of zero could be used to indicate normal operation and values other than zero can indicate particular fault conditions on the input of the elastic store.

Centralized Overhead and Pointer Processing

Embodiments of the invention implement a centralized processing block that processes pointers and overhead from a number of lanes. This significantly reduces the number of gates required to implement this processing in an ASIC or FPGA. An embodiment of the invention implements an offline engine that is dedicated to processing the overhead bytes extracted from the data path.

For one embodiment of the invention, a minimal block of logic, associated with each lane, performs only those operations which must be performed on every byte (such as BIP calculation), or must be performed quickly (such as processing a pointer NDF). The vast majority of bytes do not need this speed of response and can be processed in the shared block.

For one embodiment, all other pointer and overhead bytes are tagged with an identifier, and sent to a centralized processing block. The data is sent through a FIFO, so that if bytes arrive simultaneously from several lanes, the central block can process them on a fair basis, without loosing any.

For one embodiment of the invention the centralized processing block operates on a different (e.g., slower) clock domain than the traffic processing of the lane. This allows more complex logic to complete in a single clock cycle, without the need to utilize pipelining.

For one embodiment of the invention, all pointer and overhead processing can be performed sequentially, allowing the centralized processing block to hold state information in an external or large internal memory. Using external memory for all overhead state information greatly reduces the memory requirement within the device, and allows memory intensive functions such as LO J2 path trace and TCM to be implemented without greatly increasing the size or cost of the ASIC or FPGA.

An advantage of one embodiment of the invention is that pointer and overhead processing operations do not need to be completed in 1 clock cycle, as in prior art schemes in which pointer and overhead processing operations are tightly coupled to the traffic path. A further advantage of one embodiment of the invention is that sequential processing of the pointer and overhead events facilitates event filtering by hardware, before it is reported to software, and a consistent reporting mechanism for events when they occur.

Figure 4:
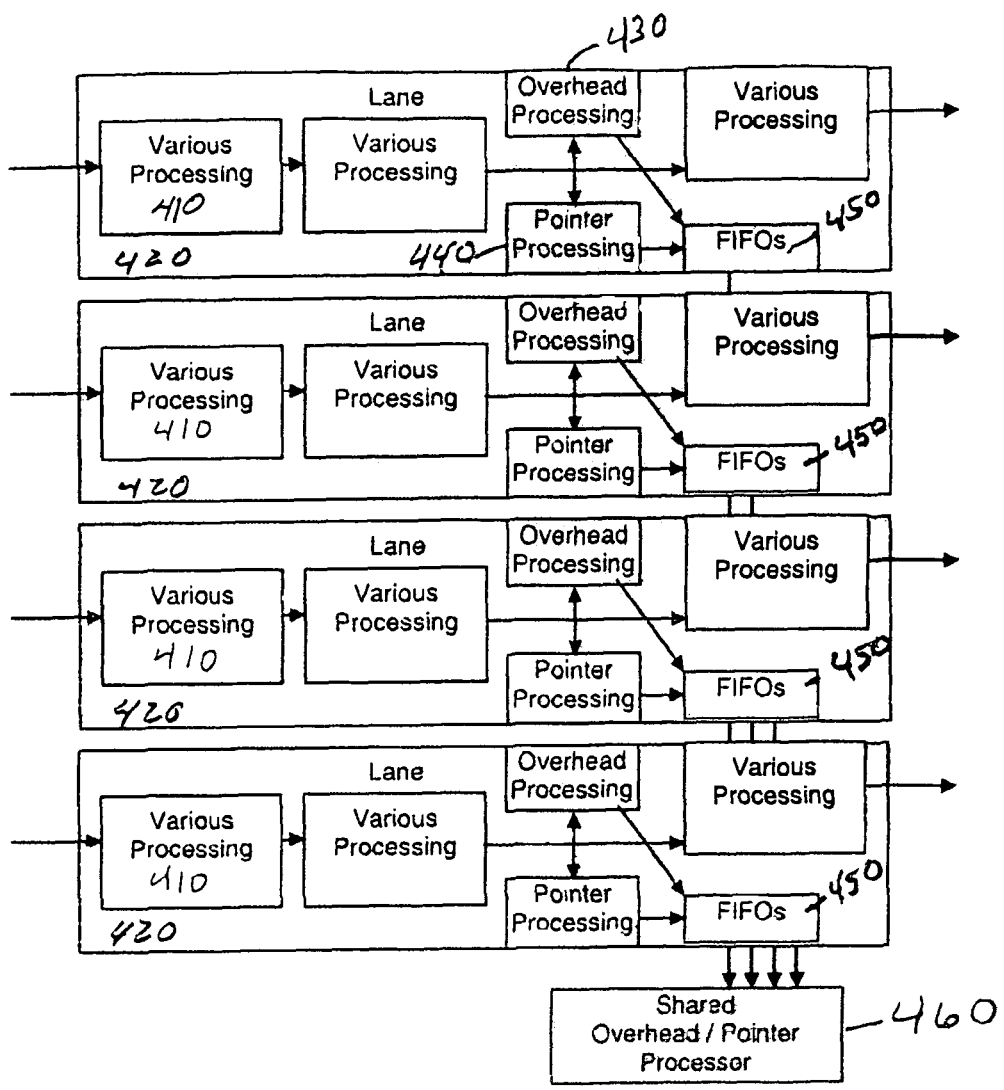
FIG. 4 illustrates centralized overhead and pointer processing using a shared central processor in accordance with one embodiment of the invention.

FIG. 4 illustrates centralized overhead and pointer processing using a shared central processor in accordance with one embodiment of the invention. In the processing scheme shown in FIG. 4, various processing 410 occurs within each of the data lanes 420. Because the pointer bytes and overhead bytes represent a small portion of the actual content of a frame of data coming in, the overhead processing 430 and the pointer processing 440 are directed through FIFOs 450 to a shared offline processing engine 460. For one embodiment, the overhead processing 430 and the pointer processing 440 is combined and passed down through a FIFO to the offline engine.

Each data lane may have various processing blocks that direct processing to the offline engine. So as a result, a lot of information will be flowing towards it. It'll be coming through quite often in bursts followed by a gap of time when it can process. The FIFO elements, which offer up the data arriving at the offline engine allow it to process each of the different data lanes within the design in turn.

General Matters

For one embodiment of the invention, egress pointer smoothing by evaluating the average fill of an elastic store over a full payload row. For one embodiment of the invention, the information related to the amount of fill in the elastic store is averaged across the length of the complete row and increment/decrement decisions based on that average figure provide smooth rate of pointers coming out even as a section overhead moves through the frame.

Embodiments of the invention, provide a signaling mechanism for marking particular bytes in the payload stream by using a write pointer function. For one such embodiment the elastic store need only be 9 bits wide.

Embodiments of the invention implement a centralized processing block that processes pointers and overhead from a number of lanes. One embodiment of the invention implements an off-line engine that is dedicated to processing the overhead bytes extracted from the data path.

Embodiments of the invention have been described above with various specific details. It will be appreciated that such details are examples and may be modified.

Embodiments of the invention have been described as including various operations. Many of the processes are described in their most basic form, but operations can be added to or deleted from any of the processes without departing from the scope of the invention.

The operations of the invention may be performed by hardware components or may be embodied in machine-executable instructions, which may be used to cause a general-purpose or special-purpose processor or logic circuits programmed with the instructions to perform the operations. Alternatively, the steps may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
by a device having an elastic store, accumulating a fill level of the elastic store by a read pointer and a write pointer, wherein the accumulating comprises determining one or more instantaneous values of the elastic store depth;
summing the one or more instantaneous values of the elastic store depth;
dividing the summed one or more instantaneous values of the elastic store depth by a predetermined value corresponding to a portion of data to determine an average fill value of the elastic store
performing an egress pointer increment operation if the average fill value is above an upper threshold; and
performing an egress pointer decrement operation if the average fill value is below a lower threshold,
wherein one or more of the upper threshold and the lower threshold is a non-integer value.

2. The method of claim 1 wherein the average fill value is determined over a fixed portion of a data.

3. The method of claim 2 wherein the fixed portion of data is a portion of a data frame.

4. The method of claim 3 wherein the fixed portion of the data frame is equal to one or more complete row lengths of the frame.

5. The method of claim 1 wherein the elastic store comprises a plurality of FIFOs; and
the average fill value of each FIFO is determined, in turn.

6. The method of claim 1, wherein one or more of the upper threshold and the lower threshold are selected based on a number of least significant bits set to '0'.

7. An apparatus comprising:
a memory;
an elastic store;
a write pointer;
a read pointer;
an integrator configured to determine an average fill value of the elastic store by accumulating a fill level of the elastic store by a read pointer and a write pointer, wherein the accumulating comprises determining one or more instantaneous values of the elastic store depth; summing the one or more instantaneous values of the elastic store depth; and dividing the summed one or more instantaneous values of the elastic store depth by a predetermined value corresponding to a portion of data; and
a pointer generator configured to:
perform an egress pointer increment operation if the average fill value is above an upper threshold; and
perform an egress pointer decrement operation if the average fill value is below a lower threshold,
wherein one or more of the upper threshold and the lower threshold is a non-integer value.

8. The apparatus of claim 7 wherein the average fill value is determined over a fixed portion of a data.

9. The apparatus of claim 8 wherein the fixed portion of data is a portion of a data frame.

10. The apparatus of claim 9 wherein the fixed portion of the data frame is equal to one or more complete row lengths of the frame.

11. The apparatus of claim 7 wherein the elastic store is comprised of a plurality of FIFOs and the average fill value of each FIFO is determined, in turn.

12. The apparatus of claim 7 wherein one or more of the upper threshold and the lower threshold are selected based on a number of least significant bits set to '0'.

13. A nontransitory program storage device readable by a machine,
embodying a program of instructions executable by the machine to perform a method, the
method comprising:
by device having an elastic store, accumulating a fill level of the elastic store by a read pointer and a write pointer, wherein the accumulating comprises determining one or more instantaneous values of the elastic store depth;

summing the one or more instantaneous values of the elastic store depth;

dividing the summed one or more instantaneous values of the elastic store depth by a predetermined value corresponding to a portion of data to determine an average fill value of the elastic store;

performing an egress pointer increment operation if the average fill value is above an upper threshold; and performing an egress pointer decrement operation if the average fill value is below a lower threshold, wherein one or more of the upper threshold and the lower threshold is a non-integer value.

14. The nontransitory program storage device of claim 13 wherein the average fill value is determined over a fixed portion of a data.

15. The nontransitory program storage device of claim 14 wherein the fixed portion of data is a portion of a data frame.

16. The nontransitory program storage device of claim 15 wherein the fixed portion of the data frame is equal to one or more complete row lengths of the frame.

17. The nontransitory program storage device of claim 14 wherein one or more of the upper threshold and the lower threshold are selected based on a number of least significant bits set to '0'.

18. The nontransitory program storage device of claim 13 wherein the elastic store is comprised of a plurality of FIFOs; and the average fill value of each FIFO is determined, in turn.

* * * * *

UNITED STATES PATENT AND TRADEMARK OFFICE
CERTIFICATE OF CORRECTION

| | | |
|---|---|---|
| PATENT NO. | : 8,588,354 B2 | Page 1 of 1 |
| APPLICATION NO. | : 11/704732 | |
| DATED | : November 19, 2013 | |
| INVENTOR(S) | : Mark Brian Carson | |

It is certified that error appears in the above-identified patent and that said Letters Patent is hereby corrected as shown below:

In the Claims

Claim 1, Column 8, Line 6, replace "store" with --store;--.

Signed and Sealed this
Eleventh Day of March, 2014

Michelle K. Lee
*Deputy Director of the United States Patent and Trademark Office*